US011999165B2

(12) United States Patent
Liu

(10) Patent No.: US 11,999,165 B2
(45) Date of Patent: Jun. 4, 2024

(54) METHOD FOR MAGNETOHYDRODYNAMIC (MHD) PRINTHEAD/NOZZLE REUSE

(71) Applicant: Additive Technologies, LLC, Palm City, FL (US)

(72) Inventor: Chu-heng Liu, Penfield, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 152 days.

(21) Appl. No.: 17/850,526

(22) Filed: Jun. 27, 2022

(65) Prior Publication Data

US 2022/0332116 A1 Oct. 20, 2022

Related U.S. Application Data

(63) Continuation of application No. 17/131,402, filed on Dec. 22, 2020, now Pat. No. 11,400,714.

(51) Int. Cl.
*B41J 2/14* (2006.01)

(52) U.S. Cl.
CPC ......... *B41J 2/14314* (2013.01); *B41J 2/1433* (2013.01)

(58) Field of Classification Search
CPC .................. B41J 2/14314; B41J 2/1433; B41J 2002/16564
See application file for complete search history.

(56) References Cited

U.S. PATENT DOCUMENTS

| | | | | |
|---|---|---|---|---|
| 5,831,643 | A * | 11/1998 | Chung | B41J 2/04563 347/88 |
| 2013/0146340 | A1* | 6/2013 | Takahashi | H05K 3/4061 174/255 |
| 2017/0365484 | A1 | 12/2017 | Kotler et al. | |
| 2018/0304370 | A1 | 10/2018 | Myerberg et al. | |
| 2018/0345573 | A1* | 12/2018 | Zinniel | B21C 33/02 |

OTHER PUBLICATIONS

Sukhotskiy et al., “Magnetohydrodynamic Drop-on-Demand Liquid Metal 3D Printing,” Solid Freeform Fabrication 2017: Proceedings of the 28th Annual International, Solid Freeform Fabrication Symposium—An Additive Manufacturing Conference, 1806-1811.

* cited by examiner

*Primary Examiner* — Jason S Uhlenhake
(74) *Attorney, Agent, or Firm* — MH2 TECHNOLOGY LAW GROUP LLP

(57) ABSTRACT

A method for operating a printer can include draining a print material from a printer, placing a sacrificial metal into the printer, ejecting the sacrificial metal from a nozzle of the printer, and cooling to printer to a temperature that is below a melting point of the print material and the sacrificial metal. The print material can be or include aluminum and the sacrificial metal can be or include tin. The print material can be drained from the printer when the print material is in molten form, for example, from about 600° C. to about 2000° C. The sacrificial metal can be ejected from the nozzle at a temperature above the melting point of the sacrificial metal but below the melting point of the print material, for example, below about 300° C. The method can reduce or eliminate cracking of various printer structures such as the nozzle during a shutdown or cooling of the printer.

21 Claims, 6 Drawing Sheets

METHOD FOR MAGNETOHYDRODYNAMIC (MHD) PRINTHEAD/NOZZLE REUSE

CROSS-REFERENCE TO RELATED APPLICATIONS

This application is a continuation application of U.S. patent application Ser. No. 17/131,402 filed on Dec. 22, 2020 which is hereby incorporated by reference in its entirety.

TECHNICAL FIELD

The present teachings relate to the field of printing, such as three dimensional printing, functional printing, and other printing and, more particularly, to methods and structures for printing high melting point temperature materials such as metals and metal alloys.

BACKGROUND

Drop-on-demand (DOD) printers that are capable of jetting or ejecting high temperature materials such as a metal are being developed and improved. One type of printer employs magnetohydrodynamic (MHD) technology to manipulate an electrically conductive print fluid or print material such as liquid metal print material, for example molten aluminum, using a magnetic field to eject a single drop or volume of the print material from a nozzle. During a metal printing process, metal in a solid form can be supplied from a wire spool to a supply reservoir of the printer. The solid metal is heated within the supply reservoir to a temperature sufficient to melt the solid metal and to maintain a level of liquid metal within the supply reservoir. When the level of liquid metal within the supply reservoir is sufficient, the liquid metal is passed from the supply reservoir through a channel to the nozzle, and printing can be initiated. The liquid metal that is ejected from the nozzle onto a surface is replaced so that a desired level or volume of liquid metal is maintained within the supply reservoir. Thus printing of liquid metal can be continuous.

To prepare a metal printer for storage or other periods of nonuse after printing, the molten metal print fluid can be drained through the nozzle then the printer can cooled. Draining the print fluid prior to cooling the printer reduces problems associated with thermal mismatch between the print material and various printer structures.

A method for use with a printer that prints a high-temperature print fluid such as a liquid metal that reduces damage to printer structures would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a method for operating a printer includes draining a print material from a supply reservoir of the printer, wherein the print material is a first metal having a first melting point, placing a sacrificial metal into the supply reservoir of the printer, wherein the sacrificial metal is a second metal having a second melting point that is lower than the first melting point, ejecting the sacrificial metal from a nozzle of the printer, and cooling the printer subsequent to ejecting the sacrificial metal from the nozzle.

Optionally, the method can further include ejecting the print material from the nozzle of the printer prior to the draining of the print material. The ejecting of the print material can further include ejecting the first metal from the nozzle at a temperature that is above the first melting point, for example at a temperature of from 600° C. to 2000° C. The first metal can include aluminum with a melting point greater than 600° C., and the draining of the print material can include ejecting the print material from the nozzle of the printer at a temperature greater than 600° C. Further, the second metal can include tin with a melting point less than 300° C., and the ejecting of the sacrificial metal from the nozzle can include ejecting the sacrificial metal from the nozzle of the printer at a temperature of less than 300° C. The cooling of the printer can include cooling the sacrificial metal to a temperature of from 20° C. to 22° C.

Some implementations include placing a volume of the print material within the supply reservoir of the printer subsequent to the cooling of the printer, then ejecting the print material from the nozzle of the printer at a temperature above the first melting point.

In another implementation, a printer shutdown process includes draining a metal print material from a supply reservoir of the printer, wherein the print material has a first melting point and the metal print material is at a first temperature that is above the first melting point during the draining, placing a sacrificial metal within the supply reservoir of the printer, ejecting the sacrificial metal from the supply reservoir of the printer through a nozzle of the printer, wherein the sacrificial metal has a second melting point that is lower than the first melting point and the sacrificial metal is at a second temperature that is below the first melting point and above the second melting point during the ejecting, and cooling the printer to a third temperature that is below the first melting point of the print material and the second melting point of the sacrificial metal. Optionally, the first temperature can be from 600° C. to 2000° C. and the second temperature can be below 300° C. Further, the print material can include from 80% to 100% aluminum, and the sacrificial metal can include from 30% to 100% tin.

The sacrificial metal can include from 20% to 100% of gallium, indium, tin, bismuth, zinc, cadmium, or lead, or combinations of two or more thereof.

In another implementation, a method for operating a printer includes ejecting a metal print material at a temperature of from 600° C. to 2000° C. from a nozzle of a printer, draining the metal print material at a temperature of from 600° C. to 2000° C. from the printer subsequent to the ejecting, placing a sacrificial metal into a supply reservoir of the printer, heating the sacrificial metal to a temperature of 300° or less, thereby melting the sacrificial metal, ejecting the sacrificial metal from the nozzle of the printer while the sacrificial metal is melted and at a temperature of 300° C. or less, and cooling the printer to a temperature of from 20° C. to 22° C. subsequent to the ejecting of the sacrificial metal from the nozzle of the printer, thereby solidifying the sacrificial metal within the printer.

Optionally, subsequent to the cooling of the printer, the method can further include heating the sacrificial metal within the printer to a temperature of 300° C. or less, thereby melting the sacrificial metal, draining the melted sacrificial metal from the printer, placing the metal print material into the supply reservoir of the printer, heating the metal print material to a temperature of from 600° C. to 2000° C., thereby melting the metal print material, then ejecting the metal print material at a temperature of from 600° C. to 2000° C. from the nozzle of the printer.

Optionally, the method can further include placing the drained metal print material into the supply reservoir of the printer, heating the drained metal print material to a temperature of from 600° C. to 2000° C., thereby melting the drained metal print material, and ejecting the melted drained metal print material from the nozzle of the printer.

The metal print material can optionally include at least one of aluminum, copper, iron, and titanium, or combinations thereof, and the sacrificial metal can optionally include at least one of gallium, indium, tin, bismuth, zinc, cadmium and lead or combinations of two or more thereof, and further comprises at least one of aluminum, copper, iron, and titanium, or combinations of two or more thereof.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
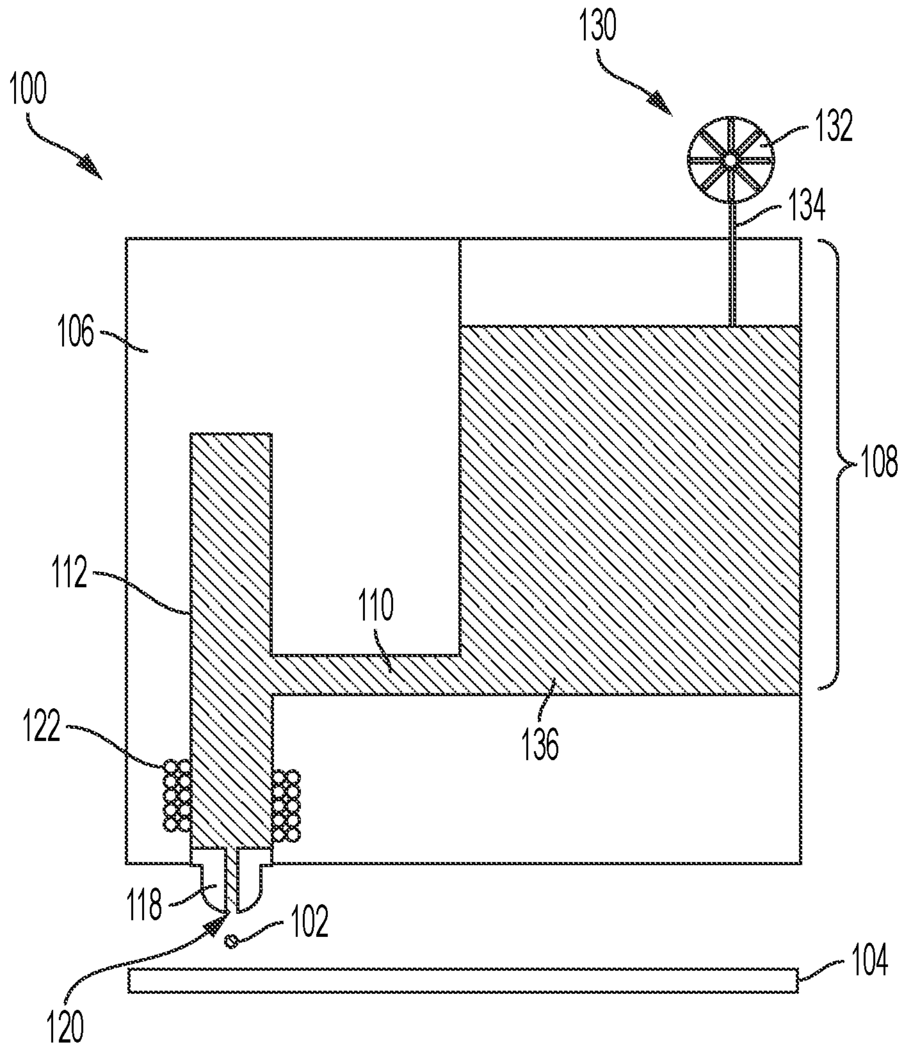
FIG. 1 is a schematic cross section of a printer with a reservoir of the printer according to an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As used herein, unless otherwise specified, the word "printer" encompasses any apparatus that performs a print outputting function for any purpose. Further, as used herein, the term "sacrificial" metal refers to a material that is used during a printer shutdown process but is not used in any significant amount to form a printed three-dimensional (3D) structure. As described below, while some of the sacrificial metal may remain in the print material when printing is resumed, the amount of sacrificial metal in the print material is small (i.e., ≤1% by volume) and does not appreciably affect the physical properties of the print material. Furthermore, some of the print material may be mixed with the sacrificial material as the sacrificial material is introduced into the reservoir after a printing process.

As discussed above, a metal printer can employ magnetohydrodynamic (MHD) technology to eject droplets of a print material such as a liquid metal from a nozzle to form a printed metal structure. After printing, the printer can be prepared for storage or other periods of nonuse by draining the print material then cooling the printer to room temperature. Because the metal used as the print material typically has a different coefficient of thermal expansion (TCE) than the structures that form the printer, draining the print fluid prior to cooling the printer reduces problems such as cracking of various printer structures resulting from a thermal mismatch between the printer and the print material. While a thin film or coating of the print material can remain on the inside structures after draining due to adhesive forces of the print material, a block that defines the supply reservoir and channels within the printer is robust and resistant to damage from the thermal mismatch of the block with the print material for this thin film. However, the nozzle from which the print material is ejected during printing is typically manufactured from a frangible material such as a ceramic or a ceramic composite, and damage to the nozzle is common. Furthermore, the print material is difficult to completely remove from the orifice of the nozzle from which the print material is jetted during printing, and thermal mismatch of the nozzle with the remaining print material can result in cracking of the nozzle during cooling of the printer. As such, the nozzle is typically replaced after a one-time use, for example, after one print session. The replacement of the nozzle requires disassembly of the printer by an operator, and the printer is out of service while the nozzle is replaced. Thus the replacement of the nozzle as a matter of course is time consuming and expensive.

Also contributing greatly to the nozzle damage is the relatively large difference between the freezing point/melting point of the print material and the temperature at which the printer is stored. (It will be appreciated that, for purposes of simplicity, the freezing point and melting point of a material as described herein are considered to be the same temperature.) As an example, aluminum used as a print material can have a freezing point of 660° C. (1220° F.), and the printer is typically stored at room temperature (i.e., as used herein, from about 20° C. to about 22° C., or about 68° F. to about 72° F.). During use, the print material is heated to above its melting point. After the print material is drained from the printer, a thin coating of the liquid print material remains on the surfaces of the printer. As the remaining print material cools and solidifies, the print material begins to apply physical stress/strain to the printer structures that it physically contacts, including the walls of the printer and the nozzle, which continues to build or increase until the print material reaches the storage temperature. In this example, the temperature difference between the freezing point of the print material and the printer storage temperature is 638° C. (1180° F.). Other possible print materials such as copper, iron, and titanium have even higher melting points resulting in an even greater temperature difference between the melting point of the print material and the storage temperature of the printer, and thus will apply even greater stresses/strains to the printer.

An implementation of the present teachings includes a method for operating and/or shutting down a metal printer that reduces, prevents, or otherwise mitigates physical damage to the nozzle so that routine replacement of the nozzle during or after a printer shutdown becomes less frequent or unnecessary.

FIG. 1 is a schematic cross section of a printer 100 such as a metal printer that uses magnetohydrodynamic (MHD) technology to eject metal droplets 102 in liquid (i.e., molten) form onto a surface 104 during a printing process. Use of various aspects and structures according to the present teachings with other ejection technologies is contemplated. Further, it will be appreciated that the figures depict generalized example schematic illustrations, and an actual printer in accordance with the present teachings can include other structures that are not depicted for simplicity, while various depicted structures can be removed or modified.

The printer 100 of FIG. 1 includes a block 106 that defines a reservoir 108, a supply inlet 110, and an ejection chamber 112. While the block 106 is depicted as a single structure, it will be appreciated that the block 106 can include two or more sections that are attached together. The block 106 can be or include, for example, boron nitride, graphite, glass, ceramics, or a metal (e.g., tungsten) or a metal alloy that has a higher melting point than the metal used as the print material. The printer 100 further includes a nozzle 118, such as a replaceable nozzle 118. The nozzle 118 includes and/or defines an orifice 120 from which the metal droplets 102 are ejected during printing. The printer 100 further includes an ejector 122 that is electrically engaged (or, depending on the ejection mechanism, mechanically or otherwise engaged) to eject the metal droplets 102 from the orifice 120 of the nozzle 118. The ejector 122 can be, for example, an electromagnetic coil 122 that encircles the ejection chamber 112, or another type of ejector 122.

FIG. 1 further depicts a metal supply 130 which, in this implementation, is a supply reel 132 that supplies a metal wire 134 in solid form to the reservoir 108. The metal wire 134 is melted within the reservoir 108 and becomes a print material 136 (i.e., a print fluid) in the form of liquid (i.e., molten) metal. The print material 136 flows from the reservoir 108, through the supply inlet 110, into the ejection chamber 112 and to the nozzle 118. Printers including other flow paths for the print material 136 are contemplated. The metal wire 134 can be or include a solid aluminum wire or another solid metal or metal alloy, and the print material 136 can be or include a molten aluminum or another molten metal or metal alloy.

To eject a metal droplet 102 from the orifice 120 of the nozzle 118, an electric current is applied to the coil 122 which develops a pulsed magnetic field through the coil 122. This pulsed magnetic field induces an MHD-based force density within the print material 136 within the ejection chamber 112, which overcomes capillarity and/or surface tension of the print material 136 within the orifice 120 of the nozzle 118, thereby ejecting the metal droplet 102 from the orifice 120. It will be appreciated that contours of the reservoir 108, the supply inlet 110 and/or the ejection chamber 112 can be designed to improve, customize, and/or optimize flow dynamics of the print material 136 therewithin. The reservoir 108, the supply inlet 110, the ejection chamber 112, the nozzle 118, and the orifice 120 are in fluid communication, each with the other.

An implementation of the present teachings can include a printer shutdown process. The printer shutdown process can be implemented, for example, to prepare the printer for storage, maintenance, repair, or another purpose.

Figure 2:
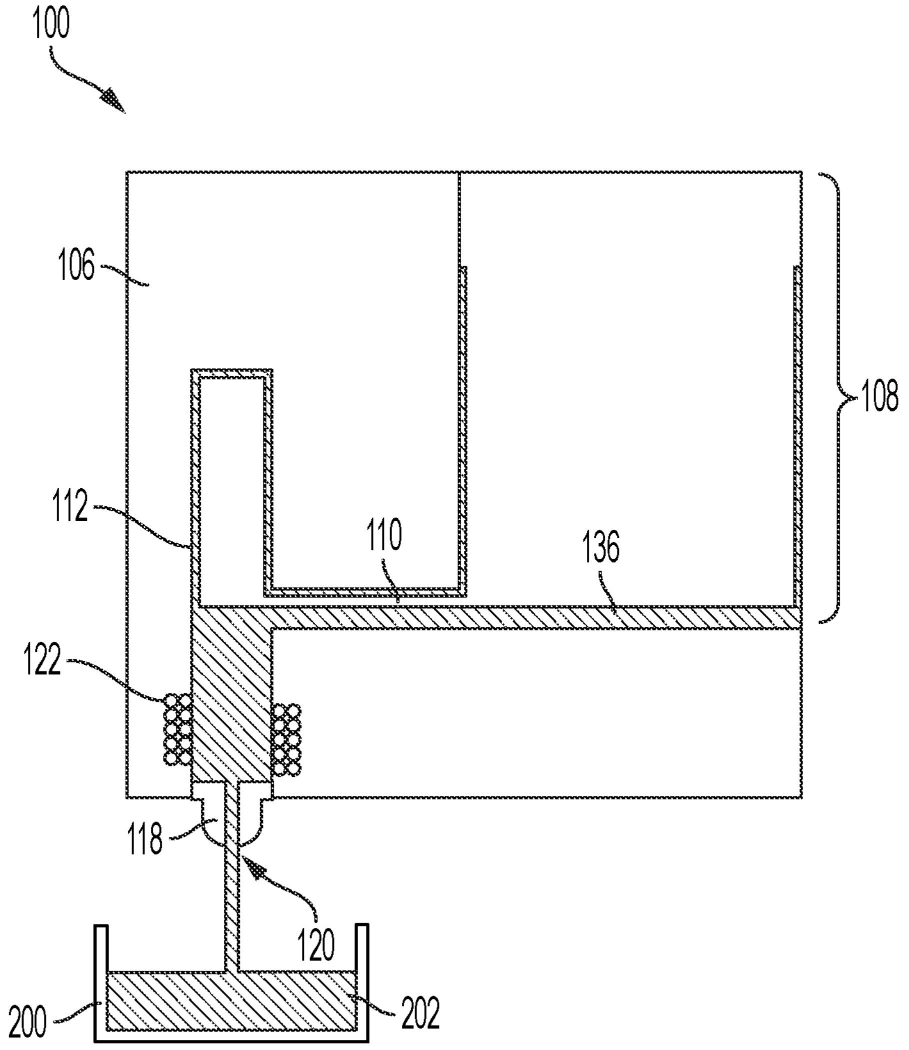
FIG. 2 depicts the printer of FIG. 1 during a draining process that drains the print material from the printer through a nozzle before the printer is cooled for storage.

After the printing process depicted in FIG. 1 has been completed, the print material 136 is drained from the printer as depicted in FIG. 2. The print material 136 can be drained from the printer 100, for example, through the orifice 120 of the nozzle 118, or through another opening, into a collection receptacle 200. The drained print material 202 can be processed for subsequent reuse as a print material 136 or recycled. FIG. 2 depicts the printer 100 during draining of the print material 136, and FIG. 3 depicts the printer 100 subsequent to the print material draining process.

Figure 3:
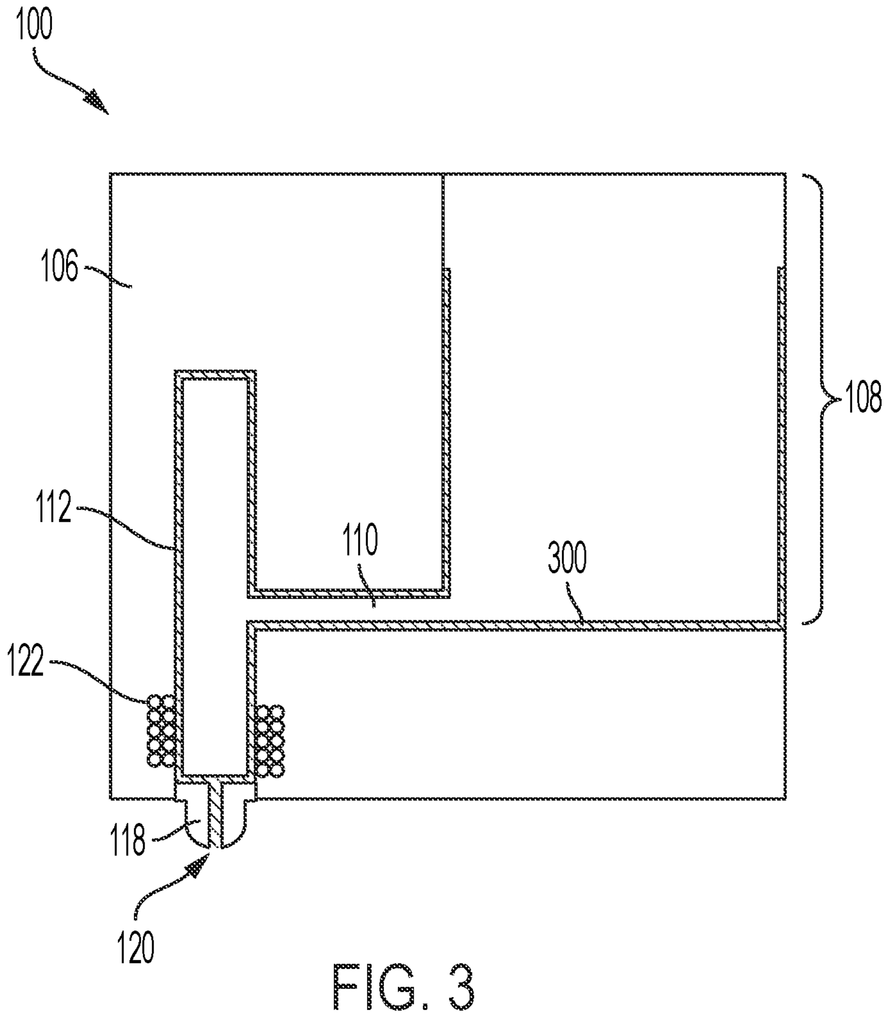
FIG. 3 depicts the printer of FIG. 2 after the print material has been drained from the printer.

After the print material draining process of FIG. 2 has been completed, the printer 100 of FIG. 3 remains. As depicted in FIG. 3, a portion of the print material 136 forms a print material coating 300 over internal surfaces of the printer 100 (e.g., over walls or surfaces of the block 106 that define the reservoir 108, the supply inlet 110, and the ejection chamber 112, and within the nozzle 118 and the orifice 120 of the nozzle 118), at least partly as a result of adhesive forces between the surfaces of the printer 100 and the print material 136. In conventional shutdown processes, the printer 100 depicted in FIG. 3 is cooled, which results in frequent cracking of the nozzle 118 due to, at least in part, stresses and strains placed on the nozzle by the print material 136 as the print material 136 cools below its melting point.

Figure 4:
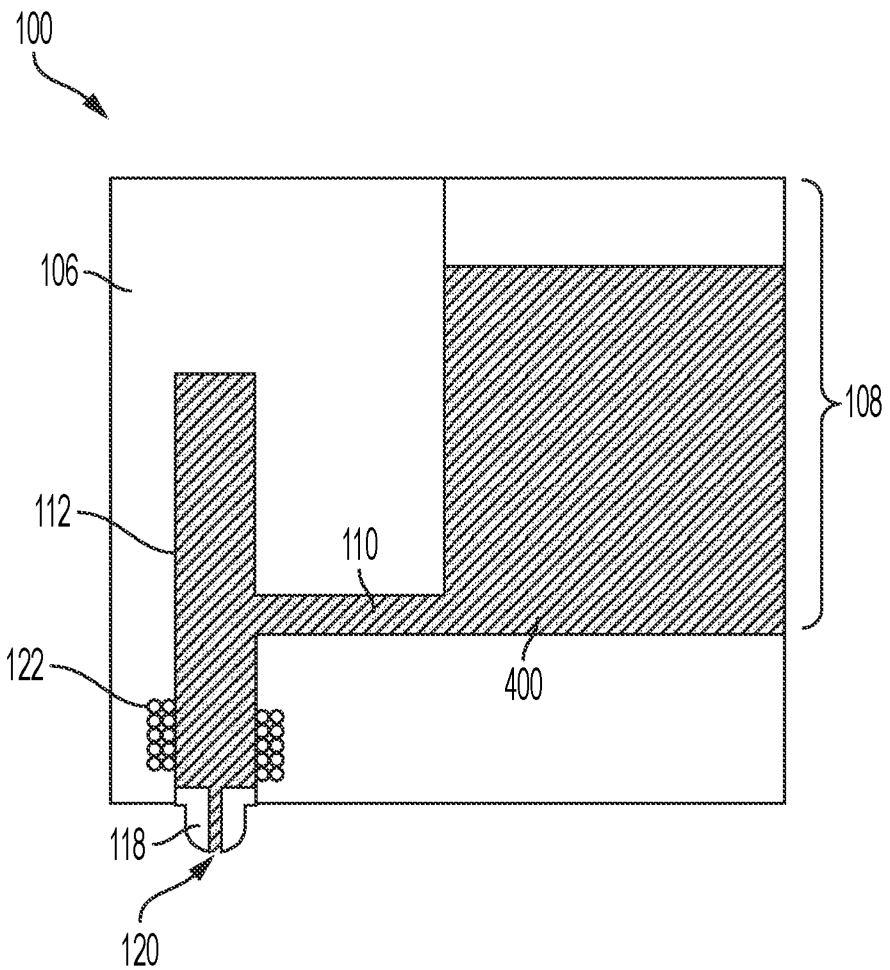
FIG. 4 depicts the printer of FIG. 3 after placing a volume of a sacrificial material into the printer.

In contrast, a shutdown process in accordance with the present teachings further includes at least partially or completely filling the printer 100 of FIG. 3 with a sacrificial metal 400 as depicted in FIG. 4. The sacrificial metal 400 can be a molten metal material that has a lower freezing temperature than the print material. In another aspect, the sacrificial metal 400 can have a TCE that more closely matches the TCE of printer structures that contact the print material, such as the nozzle 118 and the surfaces of the block 106 that define the reservoir 108, the inlet 110, and the ejection chamber 112, than does the TCE of print material 136. In some implementations, the sacrificial metal 400 can be a molten metal material that is miscible in all proportions with the metal that is used as the print material 136 when the sacrificial metal 400 and the print material 136 are in a liquid state. In other words, the sacrificial metal 400 and the print material 136 are completely soluble in one another irrespective of the order of introduction. Additionally, the sacrificial metal 400 can be a molten metal material that is a relatively soft metal when in a solid form.

When aluminum or an aluminum alloy is used as the print material 136, the sacrificial metal 400 can be tin, a tin alloy, lead, a lead alloy, a tin-lead alloy (e.g., solder), or another suitable metal or metal alloy. Tin has the physical properties of being a soft metal in solid form with a much lower melting point than an aluminum print material, and is miscible with aluminum in all proportions when in a liquid state. Further, tin has a freezing point of 232° C. (449° F.), and thus a difference between the freezing point of tin and the 22° C. (72° F.) storage temperature of the printer is 210° C. (410° F.). In contrast, as described above, aluminum as a print material has a freezing point of 660° C. (1220° F.), making the difference between the freezing point of aluminum and the storage temperature 638° C. (1180° F.). Using tin or another material described herein as a sacrificial metal during storage of the printer as described herein thus results in much lower stress/strain on the nozzle than cooling the printer immediately after draining the print material 136.

The sacrificial materials are typically chosen from metals or their alloys that have a low melting point, for example, below about 425° C., or below about 350° C., or below about 300° C., or below about 200° C. For example, by way of example and without limitation to the material listed, some low melting point materials that are contemplated include gallium (30° C.), indium (157° C.), tin (232° C.), bismuth (271° C.), zinc (420° C.), cadmium (321° C.), lead (328° C.), and etc. Depending on the composition, the melting point of metal alloys can be tuned by increasing and decreasing the percentage of each metal or other material. Furthermore, many of these elements or their alloys can mix well with various print materials such as aluminum, copper, iron, titanium and etc. at suitable temperatures. For example, when aluminum or copper is used as the print material, tin can be a good candidate for the sacrificial metal element. Either pure tin, a tin/aluminum alloy with a high percentage of tin, or a tin/copper alloy with high percentage of tin, can provide a sacrificial material having a low melting point that results in reduced thermal stress during cooling of the shutdown process.

As the sacrificial metal 400 is placed into the interior of the printer 100 as depicted in FIG. 4, the sacrificial metal 400 mixes with, and dilutes, the print material 136 that forms the print material coating 300 that remains within the printer 100 subsequent to the draining of the print material 136. A volume of the sacrificial metal 400 is much greater than a volume of the print material coating 300 within the printer 100, and thus the physical properties of the mixture of the two materials (i.e., the material coating 300 and the sacrificial metal 400) are inappreciable from those of the sacrificial metal 400 itself.

Figure 5:
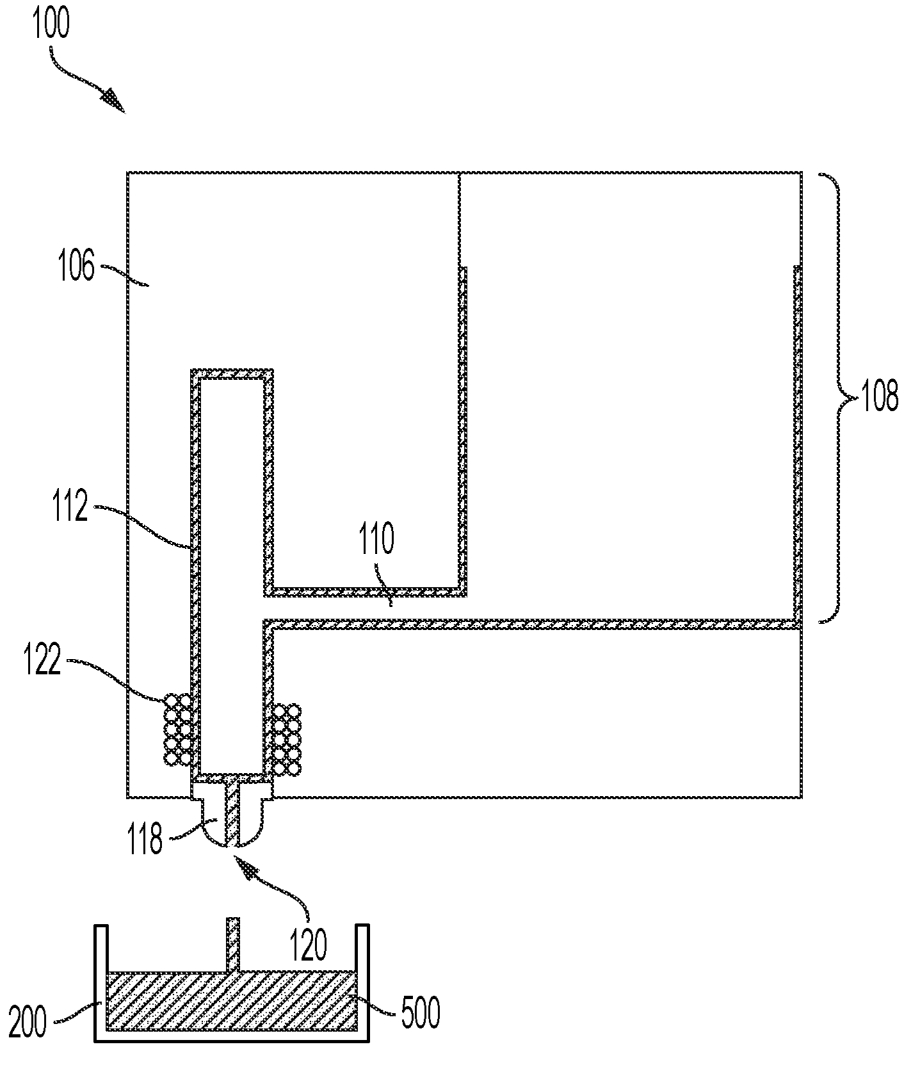
FIG. 5 depicts the printer of FIG. 4 after draining the sacrificial material from the printer through the nozzle, after which the printer can be cooled for storage.

Next, as depicted in FIG. 5, the sacrificial metal 400 is drained from the printer 100, for example, by ejecting the sacrificial metal 400 from the orifice 120 of the nozzle 118. FIG. 5 schematically depicts the printer 100 just as the draining of the sacrificial metal 400 is completed. Draining the sacrificial metal 400 removes almost all of the print material 136 that remains in the printer 100 at FIG. 3. For example, the draining of the sacrificial metal 400 as depicted in FIG. 5 can removed from about 90% to about 100%, or from about 95% to about 100%, or from about 99% to about 100% of the print material 136 that remains in the printer 100 after the FIG. 2 procedure that drains the print material 136 to result in a structure similar to FIG. 3. The drained sacrificial metal 500, which contains a low percentage of the print material 136, can be collected within a collection receptacle 200. Because the drained sacrificial metal 500 includes a very low percentage of the print material 136, the drained sacrificial metal 500 can be reused as the sacrificial metal 400 during one or more subsequent shutdown processes. The percentage of print material 136 within any reused drained sacrificial metal 500 increases with each shutdown process. After the percentage of the print material 136 within the drained sacrificial metal 500 is sufficiently high, the drained sacrificial metal 500 can be processed to remove the print material 136 or recycled.

A range of metal materials and metal alloy materials are suitable for printing, and the print materials can have very different melting points. The print material 136 can be a material that has a first freezing point/melting point of from about 500° C. to about 3000° C., or from about 600° C. to about 2500° C. The sacrificial metal 400 can be a material that has a second freezing point/melting point of from about 220° C. to about 400° C., or from about 230° C. to about 350° C., or from about 220° C. to about 320° C., or below about 300° C., or below about 200° C. The difference in the freezing point/melting point of the print material 136 and the sacrificial metal 400 can be from about 200° C. to about 2000° C., or from about 350° C. to about 1800° C., or from about 500° C. to about 1600° C.

Figure 6:
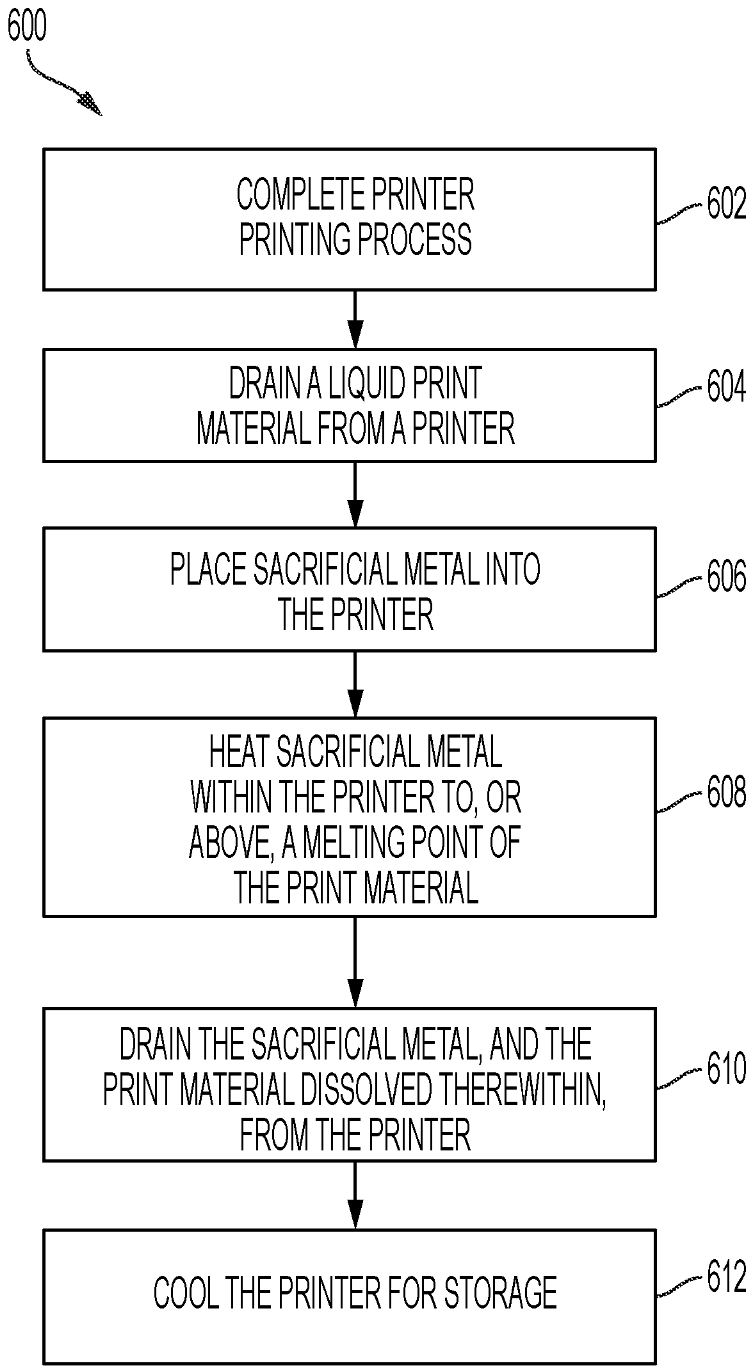
FIG. 6 is a flow chart depicting a printer shutdown process according to an implementation of the present teachings.

FIG. 6 is a flow chart of a method 600 for operating printer, where the method 600 is or includes a printer shutdown process 600. For simplicity of explanation, and without limiting the present teachings, the method 600 of FIG. 6 is described with reference to the structures depicted in FIGS. 1-5, although it is contemplated other implementations can include structures and method acts that are not depicted for simplicity, while various depicted structures and method acts may be removed or modified.

The method 600 can include completing a printer printing process as at 602. After the printing process has been completed, the print material 136 in a liquid or molten state, is drained from the printer 100. The print material 136 can be or include a metal such as aluminum or another suitable print material. The print material 136 can be drained from the printer 100 when the print material 136 is at a temperature of from about 660° C. to about 720° C., or another temperature depending on the print material used. The print material 136 can be drained from the printer 100, for example, by engaging an actuator 122 to eject the print material 136 from the orifice 120 of the nozzle 118 into a receptacle 200. In another implementation, the print material 136 can be drained through another opening in the block 106 of the printer 100 (not depicted for simplicity).

As discussed above, after draining the print material 136, a print material coating 300 can remain over internal surfaces of the printer 100 as depicted in FIG. 3. To remove or substantially remove the print material coating 300, a sacrificial metal 400 is positioned within a reservoir 108 of the printer 100, as at 606. For example, with the block 106 of the printer 100 heated to or above the melting temperature of the print fluid 136, a sacrificial metal 400 in solid form can be placed into the reservoir 108 of the printer 100 and then melted within and by the printer 100. In another implementation, the sacrificial metal 400 in liquid (molten) form can be placed into the reservoir of the printer 100. The sacrificial metal 400 in liquid form can be or include, for example, tin or a tin alloy that melts at a temperature of from about 200° C. to about 450° C.

Next, as depicted at 608, the sacrificial metal 400 is heated to a temperature that is sufficient to melt the print material coating 300. Because the sacrificial metal 400 has a much lower melting point than the print material 136, the residual temperature of the printhead after draining of the print material can still be well above the melting point of the sacrificial metal 400. In most situations, no extra heating is needed other than the residual heat in the printhead structure. For example, if the print material is or includes aluminum, the sacrificial metal 400 can be heated to a temperature of from about 400° C. to about 500° C. In this implementation, the sacrificial metal 400 is heated to a temperature that is above the melting point, but below the boiling point, of both the sacrificial metal 400 and the print material 136. Because the sacrificial metal 400 and print material 136 are miscible with each other, the print material coating 300 dissolves into the sacrificial metal 400.

Next, at 610, the sacrificial metal 400 and any print material coating 300 dissolved within the sacrificial metal 400, are drained from the printer 100. Subsequently, the printer 100 can be cooled, for example, to a temperature of from about 18° C. to about 24° C. for storage, as at 612. The temperature to which the printer is cooled at 612 is below a melting point of the print material 136 and the sacrificial metal 400. While a portion of the sacrificial metal 400 can remain in the printer 100 as depicted at FIG. 5, the freezing point of the sacrificial metal 400 is less than the freezing point of the print material 136. As such, during the cooling of the printer 100 at 612, the sacrificial metal 400 and small proportion of the print material 136 that remains in the printer does not excessively stress the structures of the printer 100, particularly the nozzle 118. This results, at least in part, from the difference between the storage temperature and the freezing temperature being much less (e.g., 400° C.

less, or 800° C., or 1500° less) for the sacrificial metal 400 than for the print material 136.

After storage of the printer 100, a startup procedure can be performed on the printer 100 to enable subsequent printing. This startup procedure can include placing the print material 136 into the reservoir 108 of the printer 100 as depicted at FIG. 1. The volume of sacrificial metal 400 that remains in the printer 100 after draining the sacrificial metal 400 as depicted at FIG. 5 is small compared to the volume of print material 136 within the printer 100 at FIG. 1. During the heating of the print material 136 at FIG. 1, the sacrificial metal 400 that remains in the printer 100 at FIG. 5 will dissolve into the print material 136. Because the volume of sacrificial metal 400 is small compared to the volume of the print material 136, the characteristics of the volume of print material 136 of FIG. 1 mixed with the volume of sacrificial metal 400 within the printer 100 of FIG. 5 is inappreciable from the print material 136 itself.

An implementation of the present teachings thus mitigates problems associated with differences in TCE's of the structures of the printer 100 and the print material 136 during a shutdown or cooling of the printer 100. Because the freezing temperature of the sacrificial metal 400 is much lower than the freezing point of the print material 136, the stress/strain applied to the structures of the printer 100, particularly the nozzle 118, during shutdown or cooling of the printer 100 is decreased. In contrast to some shutdown procedures that include routine replacement of the nozzle as a matter of course after each shutdown of the printer as a result of nozzle cracking, the shutdown procedure described herein decreases the frequency of, or eliminates, cracking of the nozzle during the cooling and/or shutdown procedure.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for operating a printer, comprising:

placing a first metal into a supply reservoir of the printer, wherein the first metal has a first melting point;

ejecting the first metal from a nozzle of the printer;

placing a second metal having a second melting point, into the supply reservoir of the printer; and allowing the second metal to dilute the first metal.

2. The method of claim 1, wherein:

the first metal comprises a sacrificial metal; and the second metal comprises a print material.

3. The method of claim 2, further comprising allowing the supply reservoir to cool after ejecting the first metal from the nozzle of the printer.

4. The method of claim 3, further comprising draining a print material from the supply reservoir of the printer prior to placing the sacrificial metal into the supply reservoir of the printer.

5. The method of claim 4, further comprising ejecting the print material from the nozzle of the printer prior to the draining of the print material.

6. The method of claim 5, wherein the ejecting of the print material further comprises ejecting the second metal from the nozzle at a temperature that is above the second melting point.

7. The method of claim 6, further comprising ejecting the print material from the nozzle of the printer when the print material is at a temperature of from 600° C. to 2000° C.

8. The method of claim 4, wherein:

the first metal comprises tin and has a melting point less than 300° C.;

the ejecting of the sacrificial metal from the nozzle comprises ejecting the sacrificial metal from the nozzle of the printer at a temperature of less than 300° C.;

the second metal comprises aluminum and has a melting point greater than 600° C.;

the draining of the print material comprises ejecting the print material from the nozzle of the printer at a temperature greater than 600° C.; and the cooling of the printer comprises cooling the sacrificial metal to a temperature of from 20° C. to 22° C.

9. The method of claim 4, further comprising:

placing a volume of the print material within the supply reservoir of the printer subsequent to the cooling of the printer; and ejecting the print material from the nozzle of the printer at a temperature above the second melting point.

10. The method of claim 4, further comprising reusing the ejected sacrificial metal during one or more printer operations.

11. A method of operating a printer, comprising:

tuning a melting point of a sacrificial metal comprising at least two metals to provide a low melting point compared to a metal print material;

diluting the sacrificial metal with the metal print material; and ejecting the sacrificial and the metal print material from a nozzle of the printer.

12. The method of claim 11, wherein tuning the melting point of the sacrificial metal comprises increasing or decreasing a percentage of at least one of the at least two metals comprising the sacrificial metal.

13. The method of claim 11, wherein:

the sacrificial metal comprises from 30% to 100% tin; and the metal print material comprises from 80% to 100% aluminum.

14. The method of claim 11, wherein the sacrificial metal comprises from 20% to 100% of gallium, indium, tin, bismuth, zinc, cadmium, or lead, or combinations of two or more thereof.

15. The method of claim 11, wherein:

the print material has a first melting point; and the sacrificial metal has a second melting point that is lower than the first melting point.

16. The method of claim 15, further comprising draining the metal print material from a supply reservoir of the printer, wherein the metal print material is at a first temperature that is above the first melting point during the draining;

placing the sacrificial metal within the supply reservoir of the printer; and ejecting the sacrificial metal from the supply reservoir of the printer through a nozzle of the printer.

17. The method of claim 16, wherein the sacrificial metal is at a second temperature that is below the first melting point and above the second melting point during the ejecting.

18. The method of claim 17, wherein:

the first temperature is from 600° C. to 2000° C.; and the second temperature is below 300° C.

19. A method of operating a printer, comprising:

placing a print material into a supply reservoir of a printer;

diluting a sacrificial metal within the supply reservoir of the printer to form an alloy; and allowing the print material to dilute the sacrificial metal; and wherein:

the print material is a first metal having a first melting point; and the sacrificial metal is a second metal having a second melting point.

20. The method of claim 19, further comprising ejecting the alloy from a nozzle of the printer.

21. The method of claim 19, wherein a volume of the sacrificial metal is small compared to a volume of print material.

* * * * *